United States Patent [19]

Tervola

[11] Patent Number: 4,729,261
[45] Date of Patent: Mar. 8, 1988

[54] STEPLESS TRANSMISSION

[76] Inventor: Pentti J. Tervola, 3663 Lakewood Rd., Lake Worth, Fla. 33461

[21] Appl. No.: 932,593

[22] Filed: Nov. 20, 1986

[51] Int. Cl.$^4$ .................. F16H 3/44; F16H 57/10
[52] U.S. Cl. ........................................... 74/778; 74/782
[58] Field of Search ................ 74/689, 687, 778, 782, 74/786

[56] References Cited

U.S. PATENT DOCUMENTS

| | | | |
|---|---|---|---|
| 2,232,252 | 2/1941 | Mathey | 74/778 X |
| 2,372,702 | 4/1945 | Armentrout | 74/778 |
| 2,373,138 | 4/1945 | Morith | 74/778 |
| 2,392,226 | 1/1946 | Butterworth et al. | 74/778 X |
| 2,653,487 | 9/1953 | Martin et al. | 74/778 X |
| 2,743,625 | 5/1956 | Moffett | 74/778 X |
| 3,447,400 | 6/1969 | Serniuk | 74/782 |
| 3,540,296 | 11/1970 | Hostutler | 74/782 X |

OTHER PUBLICATIONS

"Analyzing Hydraulic Systems" pp. 8-4, 5, Bulletin 0222-B1, Parker Fluidpower, 9/1984.

*Primary Examiner*—Dirk Wright
*Attorney, Agent, or Firm*—Renner, Otto, Boisselle & Lyon

[57] ABSTRACT

A stepless transmission including a fixed displacement rotary pump and an adjustable pressure compensated flow control valve which adjustably limits the output of the pump to any selected value between a predetermined maximum and a predetermined minimum whereat the pump housing and the pumping unit therein are locked against relative rotation. In the case of coaxial shafts fixed to the pump housing and pumping unit respectively, the driving shaft drives the driven shaft at the same speed less the speed corresponding to the adjusted limit of the pump even under varying load conditions on the driven shaft.

In the case of an epicyclic train having input and output shafts fixed to selected gears of the train, the pump-valve assembly adjustably limits the speed of rotation of another gear of the train, thereby establishing a desired speed of the output shaft under varying load conditions. In addition, a variable speed belt drive between the input shaft and the another gear of the train adjusts the pump-valve assembly responsive to increased load on the output shaft to avoid overloading of the belt drive.

4 Claims, 10 Drawing Figures

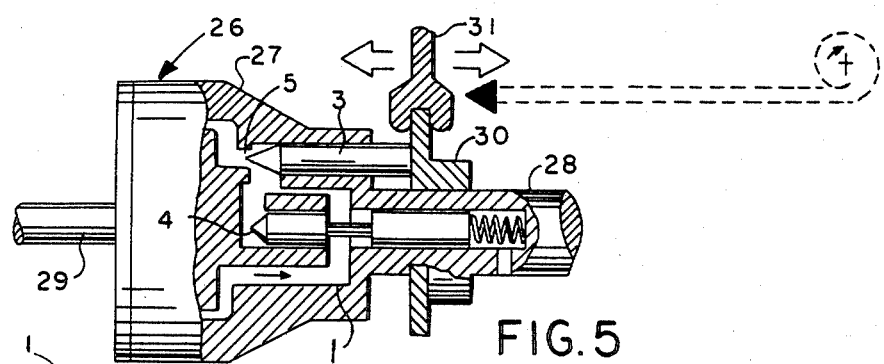
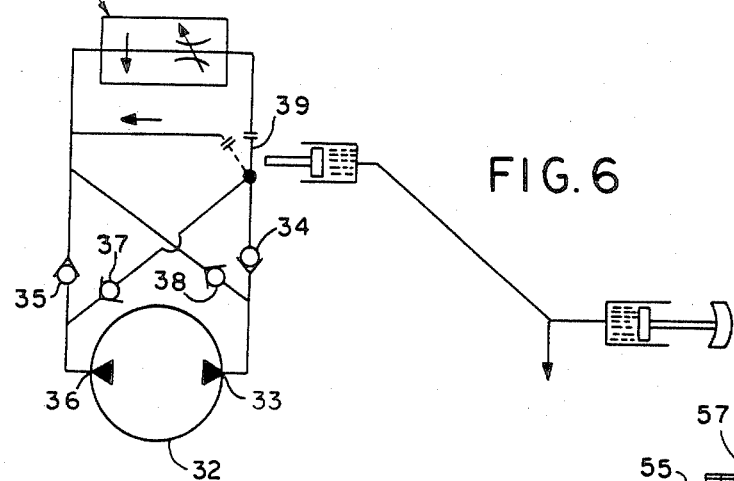
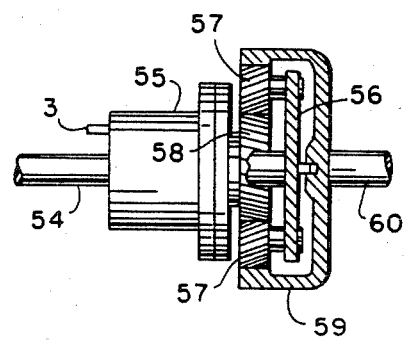
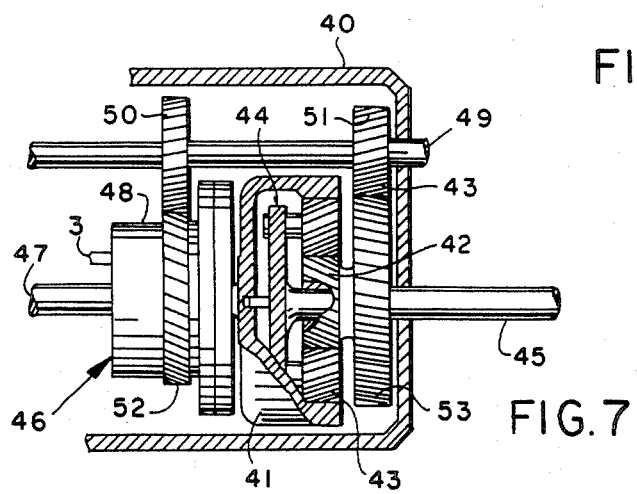

STEPLESS TRANSMISSION

BACKGROUND OF THE INVENTION

In a conventional epicyclic bevel gear train transmission numerous arrangements are possible to secure different output shaft speeds in relation to input shaft speed. In one example, the input shaft drives one bevel side gear in one direction, a separate variable speed drive (belt drive, worm drive, e.g.) drives the other bevel side gear in the opposite direction, and the spider or crosshead having bevel pinions meshing with both side gears drives the output shaft at a speed depending on the relative speeds of the side gears. The output shaft and spider or crosshead remain stationary when the speeds of the side gears are equal in opposite directions.

In a conventional epicyclic spur gear train transmission numerous arrangements are possible to secure different output shaft speeds in relation to input shaft speed. In one example, the input shaft drives the sun gear, a variable speed drive driven by the input shaft drives the ring gear in the same direction as the sun gear, and the carrier for the planet gears that mesh with the ring and sun gears drives the output shaft in either direction depending on the relative speeds of the sun and ring gears. At a certain relative speed of the sun and ring gears the output shaft and planet gear carrier will remain stationary. In another example, the input shaft drives the sun gear, a separate variable speed drive drives the planet gear carrier, and the ring gear drives the output shaft.

SUMMARY OF THE INVENTION

A simple, compact, inexpensive, and efficient stepless transmission which, in conjunction with an epicyclic train, utilizes a fixed displacement rotary pump and adjustable pressure compensated flow control valve assembly. This assembly constitutes an adjustable limit of the speed of one gear of the train while another gear of the train is driven by the input shaft of the transmission, thus to drive the assembly to the adjusted limit and to result in driving of the output shaft of the transmission at desired speed by yet another gear of the train according to the relative speeds of the gears associated with the input shaft and pump-valve assembly. The adjustable limiting of the output of the pump by the valve results in automatic increase in resistance to change in speed of the gear associated with the assembly due to increased load on the output shaft.

The stepless transmission is further characterized in that the fixed displacement rotary pump and adjustable pressure compensated flow control valve assembly, when the pump housing and pumping unit therein are coupled to respective coaxial shafts of which one is an input shaft and the other is an output shaft, provides an adjustable limit of the output of the pump and hence the speed of the output shaft in relation to the speed of the inlet shaft.

The stepless transmission herein with its fixed displacement pump and adjustable pressure compensated flow control valve which adjustably limits the output of the pump to any selected value between a predetermined maximum and a predetermined minimum whereat the transmission functions as a disengaged clutch at predetermined maximum value, as an engaged clutch at predetermined minimum value, and as a non-slipping clutch at all intermediate values.

BRIEF DESCRIPTION OF THE DRAWINGS

In the annexed drawings:

FIG. 5 is a fragmentary cross-section view showing coaxial shafts coupled respectively to the pumping unit and pump housing of a fixed displacement pump, the housing having an adjustable pressure compensated flow control valve to adjustably limit the output of the pump to achieve selected relative speeds of the coaxial shafts;

FIG. 6 is a diagrammatic illustration of bi-directional fixed displacement pump and an adjustable pressure compensated flow control valve operative to adjustably limit the output of the pump in either direction;

FIG. 7 is similar to FIG. 4 except for the location of the pump-valve assembly;

FIG. 8 is similar to FIG. 7; and

DETAILED DESCRIPTION OF THE PREFERRED EMBODIMENTS

Figure 1:
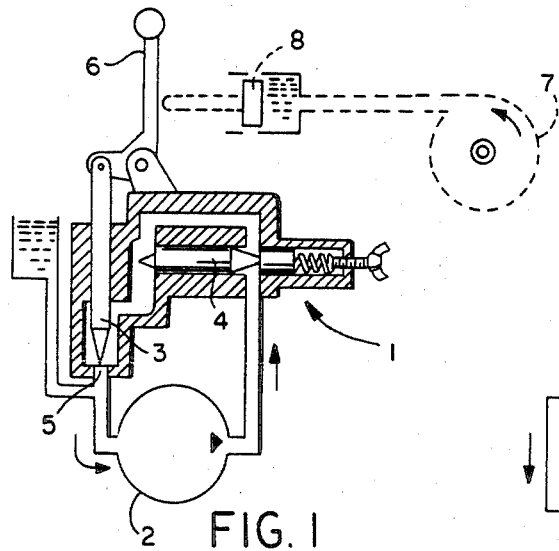
FIG. 1 is diagrammatic illustration of a fixed displacement rotary pump and an adjustable pressure compensated flow control valve operative to adjustably limit the output of the pump.
Figure 1A:
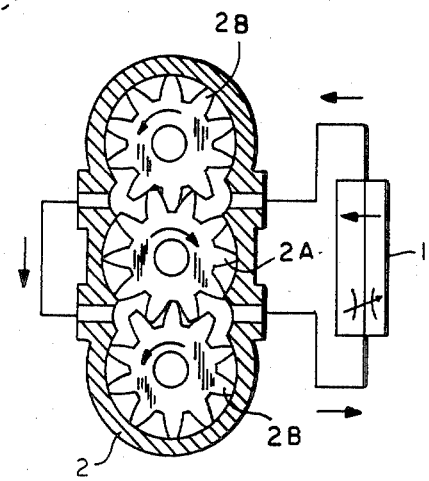
FIG. 1A is similar to FIG. 1 showing the fixed displacement pump as a three-gear pump and showing the graphic symbol of the adjustable pressure compensated flow control valve.
Figure 2:
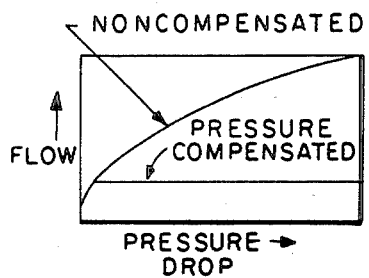
FIG. 2 is a Flow vs. Pressure Drop curve for the pressure compensated flow control valve illustrated in FIGS. 1 and 1A.

FIG. 1 shows an adjustable pressure compensated flow control valve 1 interposed between the outlet and inlet ports of a fixed displacement rotary pump 2 of the gear, vane, or piston type for example. In FIG. 1A the pump 2 is shown as a three-gear pump in which the pumping unit comprises a drive gear 2A meshing with idler or driven gears 2B. Valve 1 comprises an adjustable orifice valve 3 and a pressure compensating throttle valve 4. When the orifice valve 3 is fully open, oil is freely circulated from the pump 2 through the valve 1 and back to the pump 2. When the orifice valve 3 is fully closed by operation of lever 6, the pump 2 is locked at zero output with no relative rotation of the pump housing and pumping unit therein. When the orifice valve 3 is moved from open position toward closed position, the throttle valve 4, in known manner, maintains a constant pressure drop across the thus decreased area of orifice 5 to adjustably limit the output flow of the pump 2 despite variation in load pressure on the pump 2 as shown in FIG. 2. As later explained in detail, the adjusted output flow of the pump 2 controls the speed of the output shaft of the stepless transmission. The output speed of the output shaft may be controlled as by a hydraulic governor including a centrifugal pump 7 and piston 8 which moves lever 6 as required to maintain the selected output speed of the output shaft.

FIG. 2 shows flow versus pressure drop curves for a noncompensated valve such as a needle valve and for a pressure compensated valve 1. Accordingly, the valve 1 herein adjustably limits the output of the pump 2 so that the output remains at any selected limit at any pressure.

Figure 3:
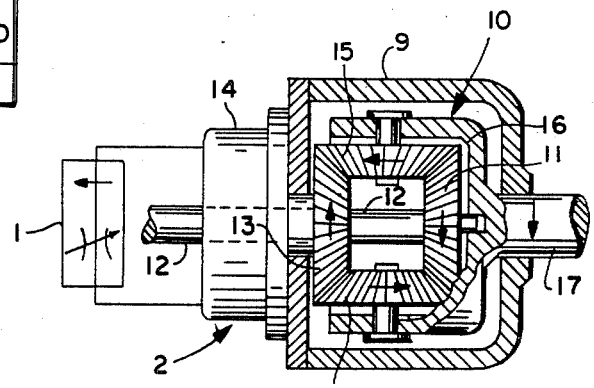
FIG. 3 is a fragmentary cross-section view of a stepless transmission utilizing the pump-valve assembly of FIGS. 1 and 1A with an epicyclic train of the bevel gear type.

In FIG. 3 the transmission housing 9 has an epicyclic train 10 of the bevel gear type therein including bevel side gear 11 driven by input shaft 12, bevel side gear 13 affixed to the pumping unit in pump housing 14 of pump 2 secured to housing 9, and bevel pinions 15 on spider 16 meshing with gears 11 and 13, the spider 16 being operative to drive output shaft 17 at a speed determined by the relative speeds of the bevel gears in opposite directions. The output of the pump 2, and hence the speed of the bevel gear 13 is adjustably limited by adjustment of the adjustable pressure compensated flow control valve 1.

By way of example, if input shaft 12 and gear 11 are rotating at 1,000 r.p.m. in the direction indicated, the valve 1 is adjusted to limit the pump output to allow 1,000 r.p.m. rotation of gear 13 in the opposite direction whereby the spider 16 and output shaft 17 remain stationary. However, if the speed of input shaft 12 and gear 11 is increased while the speed of the gear 13 remains at the adjusted limit of 1,000 r.p.m., the spider 16 and output shaft 17 will be rotated in the direction indicated at a speed depending on the difference in the speeds of the gears 11 and 13. As evident, a variation of load on the output shaft 17 will result in variation of load on gears 11 and 13 and variation of load pressure in the pump 2 without change in the adjusted output of pump 2 and adjusted limit of speed of the gear 13 as determined by adjustment of valve 1. When valve 1 is adjusted to close the orifice 5 the pump 2 will lock the gear 13 against rotation for maximum speed of the spider 16 and output shaft 17 at any torque up to that which can be safely accommodated by the bevel gear teeth and shafts 12 and 17.

As apparent, the shafts 12 and 17 may be output and input shafts respectively desired.

Figure 4:
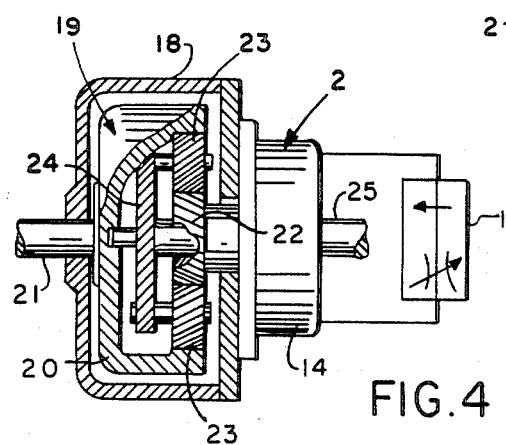
FIG. 4 is the same as FIG. 3 except that the epicyclic train is of the spur gear type.

In FIG. 4 the transmission housing 18 has an epicyclic train 19 of the spur gear type including a ring gear 20 driven by input shaft 21, a sun gear 22 affixed to the pumping unit in the pump housing 14 of pump 2 secured to housing 18, and planet gears 23 on carrier 24 meshing with gears 20 and 22, the carrier 24 being operative to drive output shaft 25 at a speed determined by the relative speeds of the gears 20 and 22. The output of the pump 2, and hence the speed of the sun gear 22, is adjustably limited by adjustment of the adjustable pressure compensated flow control valve 1. Thus, the adjusted speed of the output shaft 25 will be maintained despite variation of load on shaft 25. Increased loads will receive a kick by increased output pressure of the pump 2 while maintaining the adjusted limit of output flow.

In FIG. 5 the fixed displacement rotary pump 26 has the adjustable pressure compensated flow control valve 1 with its adjustable orifice valve 3 and pressure compensating throttle valve 4 built into the pump housing 27. Housing 27 has an integral output shaft 28 and the input shaft 29 is fixed to the pumping unit in housing 27. The orifice valve 3 is adjusted by axial movement of the part 30 on shaft 28 by forked lever 31 to adjust the output limit of the pump 26 to establish a predetermined difference between the speeds of the input shaft 29 and output shaft 28 under varying conditions of load on output shaft 28. As evident, the shafts 28 and 29 may be input and output shafts respectively.

FIG. 6 illustrates a bi-directional fixed displacement pump 32 whose output in either direction is controlled by an adjustable pressure compensated flow control valve 1. When the port 33 is the pump outlet, flow through the valve 1 to the inlet of the pump is via check valves 34 and 35 and when the port 36 is the pump outlet, flow through the valve 1 to the inlet of the pump is via check valves 37 and 38. An additional feature is the hydraulically operated valve 39 to switch the pump output in either direction to bypass the valve 1 via check valves 34 and 35 or 37 and 38.

In FIG. 7 the transmission housing 40 has therein a planetary gear set including a ring gear 41, a sun gear 42, and planet gears 43 on a carrier 44 meshed with ring gear 41 and sun gear 42. Carrier 44 drives output shaft 45. The fixed displacement pump 46 and adjustable pressure compensated flow control valve 1 (see FIG. 5) are disposed around input shaft 47 in driving engagement with the pumping unit in pump housing 48 and with ring gear 41. The transmission housing 40 supports a countershaft 49 with gears 50 and 51 meshing with gears 52 and 53 of pump housing 48 and sun gear 42 respectively.

Thus, the adjusted limit of the output of pump 46 as adjusted by valve 1 is transmitted to sun gear 42 to provide a desired adjusted speed limit of the sun gear 42 to control the speed of the output shaft 45.

In FIG. 8 the input shaft 54 drives the pump housing 55 and the planet gear carrier 56, the planet gears 57 meshing with sun gear 58 and ring gear 59 which drives output shaft 60. Sun gear 58 is fixed to the pumping unit in housing 55. Housing 55 has therein (see FIG. 5) an adjustable pressure compensated flow control valve 1 which adjusts the output limit of the pump and hence determines the speed of the sun gear 58.

Figure 9:
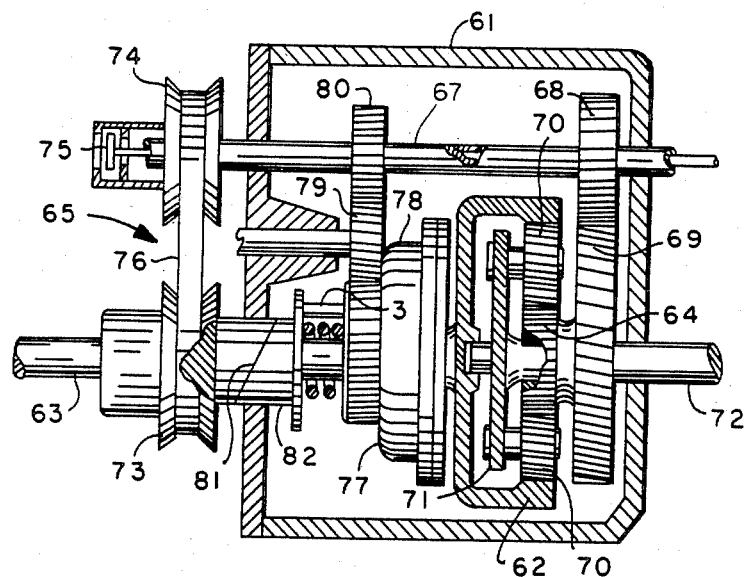
FIG. 9 is similar to FIG. 7 with the addition of a variable speed drive.

In FIG. 9 the transmission housing 61 has a planetary gear set including a ring gear 62 driven by input shaft 63; a sun gear 64 driven by the V-belt variable speed drive 65 on input shaft 63 and countershaft 67 and gears 68 and 69 on countershaft 67 and sun gear 64 respectively; and planet gears 70 on carrier 71 meshing with ring gear 62 and sun gear 64, carrier 71 being fixed to output shaft 72. The drive 65 is of known construction comprising a sheave 73 keyed to shaft 63 with one-half thereof spring loaded toward the other half, and a sheave 74 keyed on countershaft 67 with one-half adjusted toward and away from the other half of control 75. A V-belt 76 running over sheaves 73 and 74 drives the sun gear 64 through gears 68 and 69 at desired speed as adjusted by drive 65.

A further feature of FIG. 9 is the provision of a fixed displacement pump 77 and adjustable pressure compensated flow control valve 1 assembly, the pump housing 78 being geared to countershaft 67 by reversing gear 79 and gear 80. Normally, the adjustable orifice valve 3 is open so that the speed of the sun gear 64 is controlled by the variable speed drive 65. The keying of sheave 73 to shaft 63 is through a spring which allows limited rotation of sheave 73 on shaft 63 due to increased load on the output shaft 72. When sheave 73 turns on shaft 63, a cam 81 on the sheave 73 moves the spring loaded cam 82 keyed on shaft 63 to move the orifice valve 3 to a restricting position to increase the output pressure of the pump 77 to thus provide the high torque through sun gear 64 needed to offset the high torque on output shaft 72.

I claim:

1. In combination, a fixed displacement rotary pump comprising a housing having inlet and outlet ports, and a pumping unit in said housing operative upon relative rotation of said housing and unit to pump fluid from said inlet port to said outlet port; an adjustable pressure compensated flow control valve operatively interposed between said ports to adjustably limit the rate of flow of fluid therethrough and consequently the rate of relative rotation of said housing and unit from a predetermined maximum to a predetermined minimum whereat said housing and unit are locked against relative rotation; and an epicyclic gear train including a first shaft in driving engagement with a first gear of said train and with one of said housing and pumping unit, and a second shaft in driving engagement with a second gear of said train; the other of said housing and pumping unit being in driving engagement with a third gear of said train.

2. In combination, a fixed displacement rotary pump comprising a housing having inlet and output ports, and a pumping unit in said housing operative upon relative rotation of said housing and unit to pump fluid from said inlet port to said outlet port; an adjustable pressure compensated flow control valve operatively interposed between said ports to adjustably limit the rate of flow of fluid therethrough and consequently the rate of relative rotation of said housing and unit from a predetermined maximum to a predetermined minimum whereat said housing and unit are locked against relative rotation; and a planetary gear set having a sun gear, a ring gear, and a planet gear on a carrier; said planetary gear set having a first shaft to which said pump housing and carrier are fixed, and a second shaft to which said ring gear is fixed; said sun gear being fixed to said pumping unit.

3. In combination, a fixed displacement rotary pump comprising a housing having inlet and outlet ports, and a pumping unit in said housing operative upon relative rotation of said housing and unit to pump fluid from said inlet port to said outlet port; an adjustable pressure compensated flow control valve operatively interposed between said ports to adjustably limit the rate of flow of fluid therethrough and consequently the rate of relative rotation of said housing and unit from a predetermined maximum to a predetermined minimum whereat said housing and unit are locked against relative rotation; and a planetary gear set having a sun gear, a ring gear, and a planet gear on a carrier; said planetary gear set having a first shaft to which said pumping unit and ring gear are fixed, a second shaft to which said carrier is fixed, and drive means to transmit rotation of said pump housing to said sun gear.

4. The combination of claim 3 wherein a V-belt variable speed drive between said first shaft and said drive means is operative to regulate the speed of said sun gear in relation to the speed of said first shaft, pumping unit, and ring gear; said variable speed drive, in response to increase in load on said second shaft, being operative to actuate said control valve to a position whereat said pump housing via said drive means resists increased speed of said sun gear due to increased load on said second shaft thereby to prevent overloading of the V-belt of said variable speed drive.

* * * * *